(12) United States Patent
Yanase

(10) Patent No.: US 7,003,113 B1
(45) Date of Patent: Feb. 21, 2006

(54) POSITION AUTHENTICATION SYSTEM AND ELECTRONIC EQUIPMENT USING THE SAME

(75) Inventor: Kazuhiro Yanase, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 09/618,281

(22) Filed: Jul. 18, 2000

(30) Foreign Application Priority Data

Jul. 23, 1999 (JP) .................................. 11-208605

(51) Int. Cl.
*H04I 9/00* (2006.01)
(52) U.S. Cl. ...................................... 380/258; 713/194
(58) Field of Classification Search ................ 380/258; 348/239; 340/426.19; 713/189, 194
See application file for complete search history.

(56) References Cited

U.S. PATENT DOCUMENTS

| | | | | |
|---|---|---|---|---|
| 5,243,652 A | * | 9/1993 | Teare et al. .................. | 380/250 |
| 5,799,082 A | * | 8/1998 | Murphy et al. .............. | 713/179 |
| 5,969,673 A | * | 10/1999 | Bickley et al. ........ | 342/357.09 |
| 6,269,446 B1 | * | 7/2001 | Schumacher et al. ....... | 713/176 |
| 6,462,778 B1 | * | 10/2002 | Abram et al. ............... | 348/239 |

FOREIGN PATENT DOCUMENTS

| | | |
|---|---|---|
| JP | 8-240852 | 9/1996 |
| JP | 10-164549 | 6/1998 |
| JP | 11-55741 | 2/1999 |

* cited by examiner

*Primary Examiner*—Gregory Morse
*Assistant Examiner*—Andrew L. Nalven
(74) *Attorney, Agent, or Firm*—Sughrue Mion, PLLC

(57) ABSTRACT

In a position authentication system and electronic equipment used for the same, image data photographed by a digital camera 1 are written into storage device 3, and at the same time GPS electric wave 5 is received by GPS receiver 2 to generate latitude/longitude information. The GPS receiver 2 encrypts the latitude/longitude information, and transmits this information as position information to center system 4. The storage device 3 stores copy-guarded place-specifying data transmitted from the center system 4. The center system 4 decodes the position information 6 input from the digital camera 1, and specifies the place on the basis of the latitude/longitude information thus obtained to generate place-specifying data. The place-specifying data thus generated are subjected to copy guard-processing and then transmitted to the digital camera 1. Accordingly, it is guaranteed that the image data stored in the storage device 3 was photographed at the place indicated by the place-specifying data and the image data was not photographed at another place.

14 Claims, 6 Drawing Sheets

POSITION AUTHENTICATION SYSTEM AND ELECTRONIC EQUIPMENT USING THE SAME

BACKGROUND OF THE INVENTION

1. Field of the Invention

The present invention relates to a position authentication system and electronic equipment using the same and particularly, to a position authentication system for authenticating latitude/longitude information of a positioning system using latitude/longitude information of GPS (Global Positioning System), and electronic equipment using the same.

2. Description of the Related Art

GPS (Global Positioning System) has been broadly known as one of methods for specifying the position of a mobile unit. In GPS, the position of a mobile unit on the plane can be specified by measuring the apparent distances from a mobile unit to each of three or more artificial satellites which transmit GPS signals (GPS satellites), and the position of the mobile unit in the height direction can be also specified by using four or more GPS satellites.

GPS is not only used for the position specification of mobile units such as a car, a ship, or an air plane, but also applied to various equipment. For example, Japanese Laid-open Patent Publication No. Hei-8-240852 discloses a camera in which position information and time information on a photographing position are obtained by using GPS and the information thus obtained is recorded along with an image on a film, and a filing device for filing photographic images taken by the camera. Further, Japanese Laid-open Patent Publication No. Hei-11-055741 discloses a method for obtaining position information by using GPS in a mobile computing terminal having a communication function, and registering the position information in a position information management center to unitarily manage the moving statuses of persons, vehicles, or the like every registration group.

However, the conventional equipment for specifying the position information and the time information by using GPS has no means for authenticating whether the position information and the time information are right or not.

Digital data (images) taken by a digital camera can be easily tampered by a computer, and thus reliability to the photographed digital images as evidence may be degraded (for example, accident records, construction records of construction works). In order to avoid this disadvantage, Japanese Laid-open Patent Publication No. Hei-10-164549 discloses an image authentication system of supplying authentication information on the identity of the photographed digital image data in such a style as to be integral with and inseparable from the digital image data.

According to the conventional image authentication system, an image is divided into two areas (first and second areas), and authentication information is generated from the image data in one (first) area (hereinafter referred to as "first-area image data"). The authentication information thus generated is hidden into the image data in the other (second) area (hereinafter referred to as "second-area image data"), the second-area image data containing the authentication information are combined with the first-area image data, and then the combined image data are recorded. When the identity is authenticated, first authentication information is generated from the first-area image data, the authentication information hidden in the second-area image data (second authentication information) is extracted from the second-area image data, and both the authentication information pieces are collated with each other. If both are coincident with each other, it is judged that the image is not tampered. Therefore, authentication means must be provided every terminal for judging the identity, and thus the cost of the terminal rises up. The above-described conventional image authentication system does not disclose the authentication of position information and time information obtained by using GPS.

SUMMARY OF THE INVENTION

It is an object of the present invention to provide an authentication system which can authenticate position information and time information obtained by using GPS or the like, and electronic equipment using the authentication system.

Further, it is another object of the present invention to provide an authentication system which can reduce the cost of the electronic equipment to be used.

In order to attain the above objects, according to a first aspect of the present invention, there is provided an authentication system comprising: portable electronic equipment including at least a position information detecting-and transmitting-means for detecting current position information, encrypting the position information and transmitting the encrypted position information to the outside, and storage means for storing reception data; and a center system for receiving the position information transmitted from the electronic equipment, authenticating the position information, generating place-specifying data indicated by the position information thus authenticated and then performing a copy guard-processing on the place-specifying data, and transmitting the place-specifying data thus processed to the electronic equipment which has transmitted the position information, thereby storing the place-specifying data into the storage means of the electronic equipment.

According to the authentication system thus constructed, the electronic equipment generates the current position information and transmits it to the center system. After the position information is authenticated in the center system, it is subjected to the copy guard-processing, and then returned to the electronic equipment to be stored in the storage means of the electronic equipment. Therefore, the position information which has been authenticated in the center system can be stored in the storage means of the electronic equipment.

According to a second aspect of the present invention, there is provided a position authentication system comprising: an electronic equipment including image data-generating means for photographing a desired subject to generate image data, position information-detecting means for detecting current position information, transmitting means for encrypting and transmitting the image data and position information, and storage means for storing reception signals; and a center system including receiving means for receiving the position information and image data transmitted from the electronic equipment, authenticating means for authenticating whether the position information and image data thus received can be decoded, place specifying data-generating means for generating place-specifying data indicated by the authenticated position information, and copy guard-processing means for adding the place-specifying data to the image data received, subjecting the data to a copy guard-processing and transmitting the copy guard-processed data to the electronic equipment to store the data into the storage means of the electronic equipment.

According to the position authentication system described above, when electronic equipment having storage means for storing image data such as a digital camera is used, the position information which has been authenticated in the center system can be stored in the storage means of the electronic equipment.

In order to attain the above objects, according to a third aspect of the present invention, there is provided electronic equipment for use in a position authentication system, comprising: position information detecting- and transmitting-means for detecting current position information, encrypting the position information and then transmitting the encrypted position information to a center system; and storage means for receiving the place-specifying data which is generated on the basis of the position information decoded and subjected to a copy guard-processing by the center system, and transmitted from the center system, and storing the received data.

According to the electronic equipment thus constructed, the position information which has been authenticated in the center system can be stored in the storage means of the electronic equipment.

DETAILED DESCRIPTION OF THE PREFERRED EMBODIMENTS

Preferred embodiments according to the present invention will be described hereunder with reference to the accompanying drawings.

Figure 1:
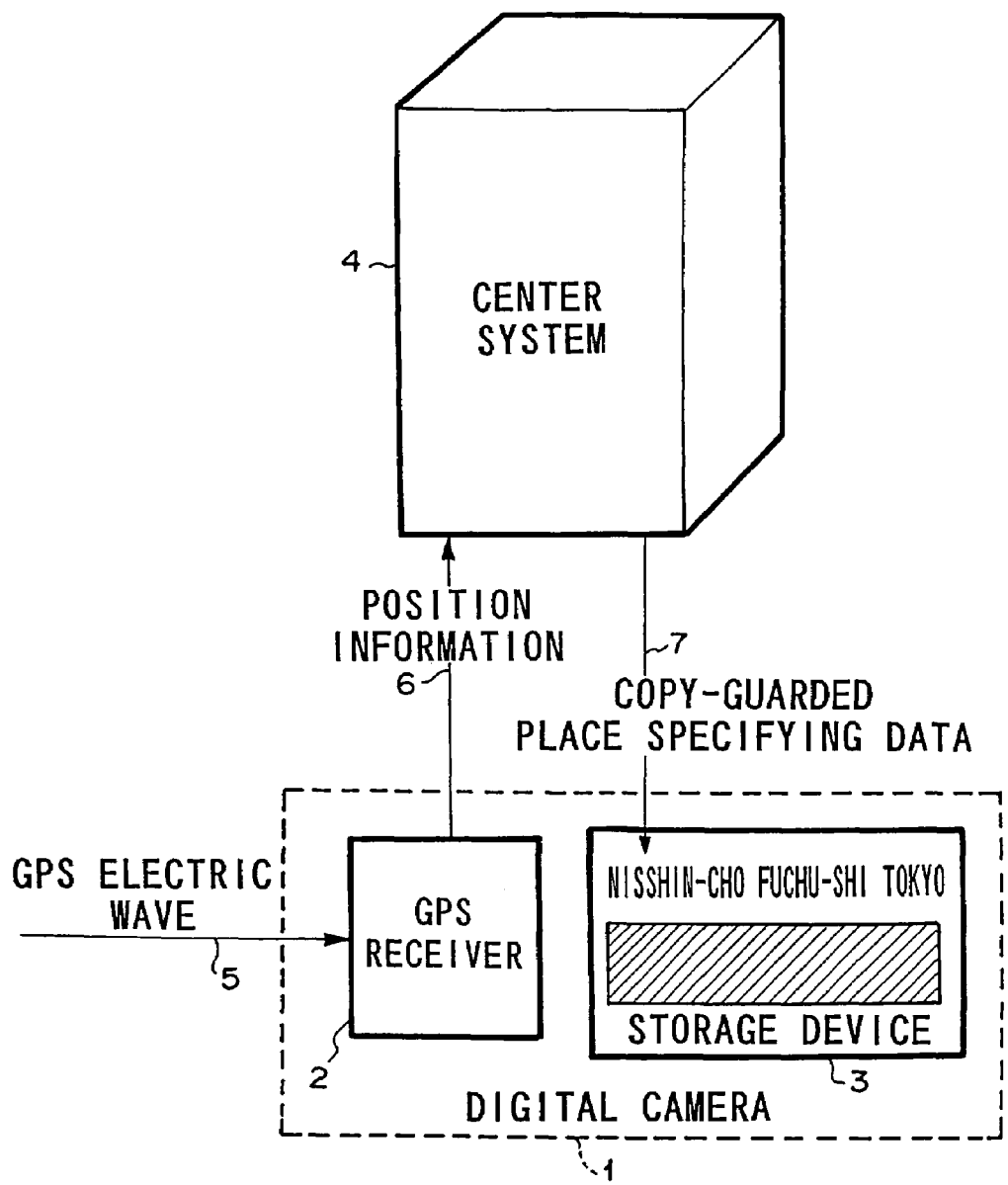
FIG. 1 is a schematic diagram showing an embodiment of a position authentication system and electronic equipment used for the position authentication system according to the present invention.

FIG. 1 is a schematic diagram showing the construction of an embodiment of a position authentication system and electronic equipment used for the position authentication system according to the present invention.

In FIG. 1, digital camera 1 has GPS receiver 2 and storage device 3. A digital camera is an example of portable electronic equipment used for the position authentication system according to this embodiment.

The digital camera 1 writes photographed image data into the storage device 3, and at the same time it receives GPS electric wave 5 from the GPS receiver 2 and generates latitude/longitude information.

The GPS receiver 2 further encrypts the latitude/longitude information, and transmits it as position information 6 to center system 4. The transmission method may be carried out in a wired or wireless (radio) mode, and it may be applied to a cellular phone network, or the like. The storage device 3 for storing image data also stores place-specifying data which is transmitted from the center system 4 while subjected to copy guard-processing.

The center system 4 decodes the position information 6 input from the digital camera 1 to specify a place on the basis of the latitude/longitude information thus obtained and generate place-specifying data representing the place thus specified, subjects the place-specifying data to the copy guard-processing and then transmits the place-specifying data thus processed to the digital camera 1. The center system 4 has authentication unit 9, place specifying data base 10 and copy guard device 11 as shown in the block diagram of FIG. 3 described later. The authentication unit 9 decodes the position information 6 input thereto. The place specifying data base 10 generates the place-specifying data on the basis of the latitude/longitude information input thereto, and outputs the place-specifying data thus generated. The copy guard device 11 outputs the place-specifying data 7 which has been subjected to the copy guard-processing.

Figure 2:
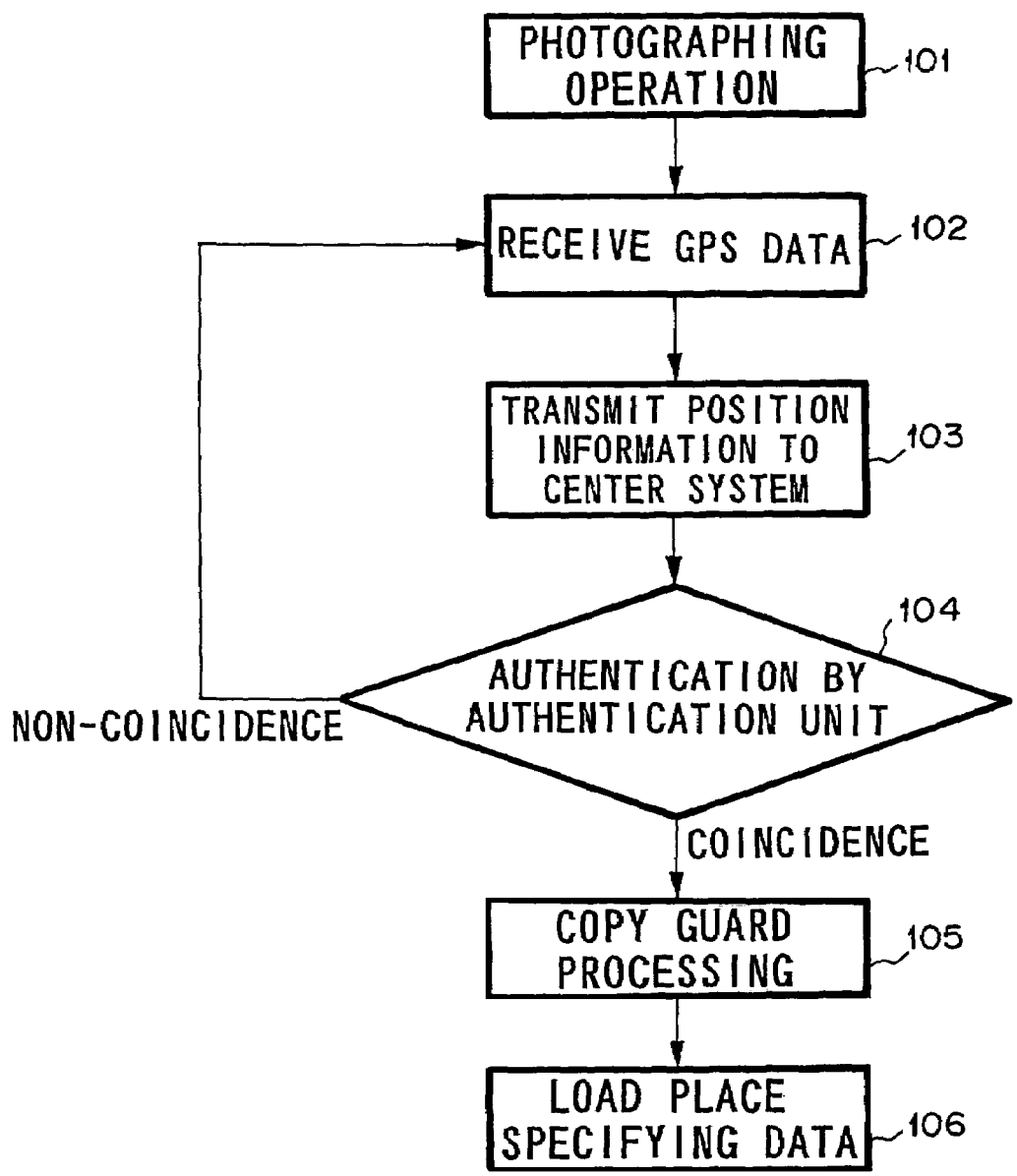
FIG. 2 is a flow chart showing the operation of FIG. 1.
Figure 3:
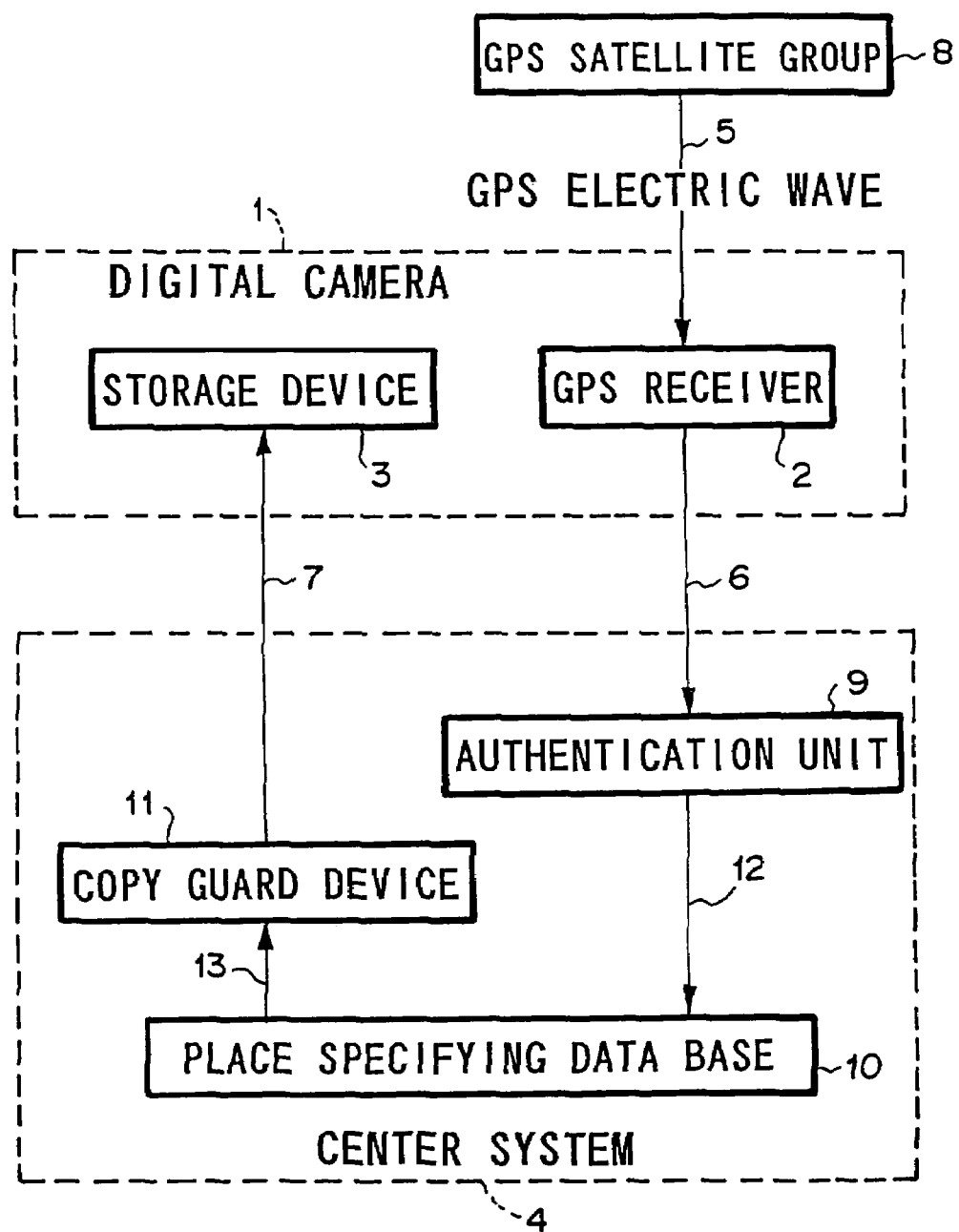
FIG. 3 is a block diagram showing the position authentication system and the electronic equipment used for the position authentication system.

Next, the operation of this embodiment will be described with respect to the combination of the construction diagram of FIG. 1, the detailed block diagram of FIG. 3 and the flowchart of FIG. 2. The same elements as shown in FIGS. 1 and 3 are represented by the same reference numerals.

First, a photographing operation of taking photographs of a desired subject with digital camera 1 by a user is carried out (step 101). At this time, incident light from the subject which is taken from the lens of the digital camera 1 is converted to image data by well-known means in the digital camera 1 and then the image data is written into the storage device 3.

Subsequently, the GPS receiver 2 in the digital camera 1 receives GPS electric wave transmitted from a GPS satellite group 8 at all times (step 102) to generate latitude/longitude information, encrypts the latitude/longitude information on the basis of a predetermined encrypting key and then transmits the encrypted latitude/longitude information as the position information 6 to the center system 4 (step 103).

The center system 4 receives the position information 6, and decodes the position information 6 in the authentication unit 9 thereof. At this time, when the latitude/longitude information has been tampered, it cannot be decoded. That is, the authentication unit 9 knows the encrypting key of the position information 6 in advance, and thus the position information 6 can be normally decoded in accordance with the encryption of the position information. Therefore, if the position information 6 can be decoded normally, authentication coincidence is judged. On the other hand, if the position information 6 cannot be decoded normally, authentication non-coincidence is judged (step 104).

If the authentication non-coincidence is judged, the subsequent processing is not carried out, and the processing waits for input of next position information 6. If the authentication coincidence is judged, the latitude/longitude information 12 obtained through the decoding operation is input to the place specifying data base 10 from the authentication unit 9, whereby the place-specifying data 13 indicating the place (address) specified by the latitude/longitude 12 is output.

The place-specifying data 13 is supplied to the copy guard device 11 in the center system 4, and subjected to the copy guard-processing (step 105). Thereafter, it is transmitted as copy-guarded place-specifying data 7 from the center system 4 to the digital camera 1 serving as the transmission source by a well-known method.

When receiving the place-specifying data 7 thus copy-guarded, the digital camera 1 stores the place-specifying data 7 into the storage device 3 having photographed image data so that the place-specifying data 7 are associated with the image data concerned. If the copy-guarded place-specifying data 7 are about to be copied to another recording medium from the storage device 3, the copy recording cannot be normally performed, or even if information can be recorded, the information cannot be normally reproduced, whereby unauthorized copy can be prevented. The copy guard method itself has been well known (for example, SCMS (Serial Copy Management System) or the like), and this method may be used.

Accordingly, it is guaranteed that the image data stored in the storage device 3 was photographed at the place indicated by the place-specifying data, and it was not photographed at another place. In other words, it is guaranteed that the digital camera 1 surely existed in the place indicated by the place-specifying data stored in the storage device 3, and thus the position authentication function can be implemented. Further, the position authentication function is carried out by the center system 4, and thus the cost-up of the digital camera 1 can be suppressed to the minimum level.

Figure 4:
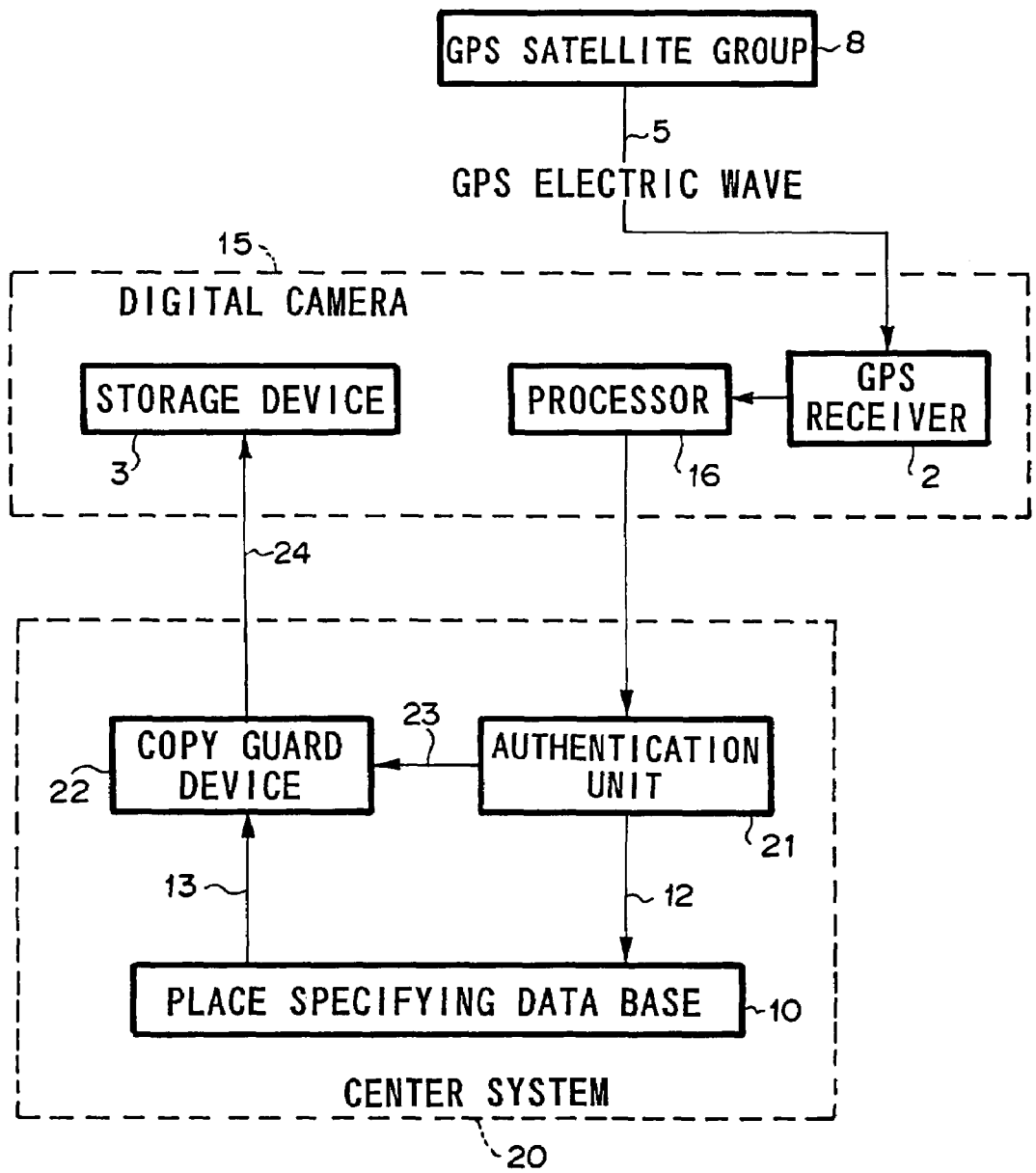
FIG. 4 is a block diagram showing another embodiment of the position authentication system and electronic equipment used for the position authentication system according to the present invention.

FIG. 4 is a block diagram showing another embodiment of the position authentication system and the electronic equipment used for the position authentication system according to the present invention. In FIG. 4, the same elements as shown in FIG. 3 are represented by the same reference numerals, and the description thereof is omitted.

In FIG. 4, a user takes a photograph of a desired subject by using digital camera 15 to obtain image data, and the image data thus obtained are written into processor 16 of the digital camera 15. At the same time, GPS receiver 2 receives GPS electric wave 5 transmitted from GPS satellite group 8 at all times to generate latitude/longitude information, and inputs the latitude/longitude information to the processor 16.

The processor 16 encrypts the image data and the latitude/longitude information corresponding to the image data on the basis of a predetermined encrypting key, and transmits these data to center system 20. The center system 20 receives transmission information from the digital camera 15, and decodes the information by authentication unit 21 thereof. If the decoding is carried out normally, decoded image data 23 are supplied to copy guard device 22, and also supplies latitude/longitude information 12 to place specifying data base 10.

If the image data or latitude/longitude information is tampered, normal decoded image data or latitude/longitude information could not be obtained in the authentication unit 21. Therefore, the authentication unit 21 does not supply the decoded image data 23 to the copy guard device 22. The copy guard device 22 in the center system 20 receives from the place specifying base 10 the place-specifying data 13 indicating the place (address) indicated by the latitude/longitude information 12, adds the place-specifying data 13 to the decoded image data 23 and subjects these data to the copy guard-processing. Thereafter, the center system 20 transmits these data as copy-guarded data 24 to the digital camera 15 serving as the transmission source by a well-known method.

When receiving the above copy-guarded data 24, the digital camera 15 stores the data 24 into the storage device 3, whereby the image data and the place-specifying data which are unique in the world are stored in the storage device 3 while they are copy-guarded. Accordingly, it is guaranteed that the image data stored in the storage device 3 was photographed at the place indicated by the place-specifying data, not photographed at another place and also not tampered. In other words, the digital camera 15 surely existed at the place indicated by the place-specifying data stored in the storage device 3, and the position authentication function can be implemented. When the image data can be normally decoded, it is authenticated that the image data were surely transmitted from the digital camera 15.

Figure 5:
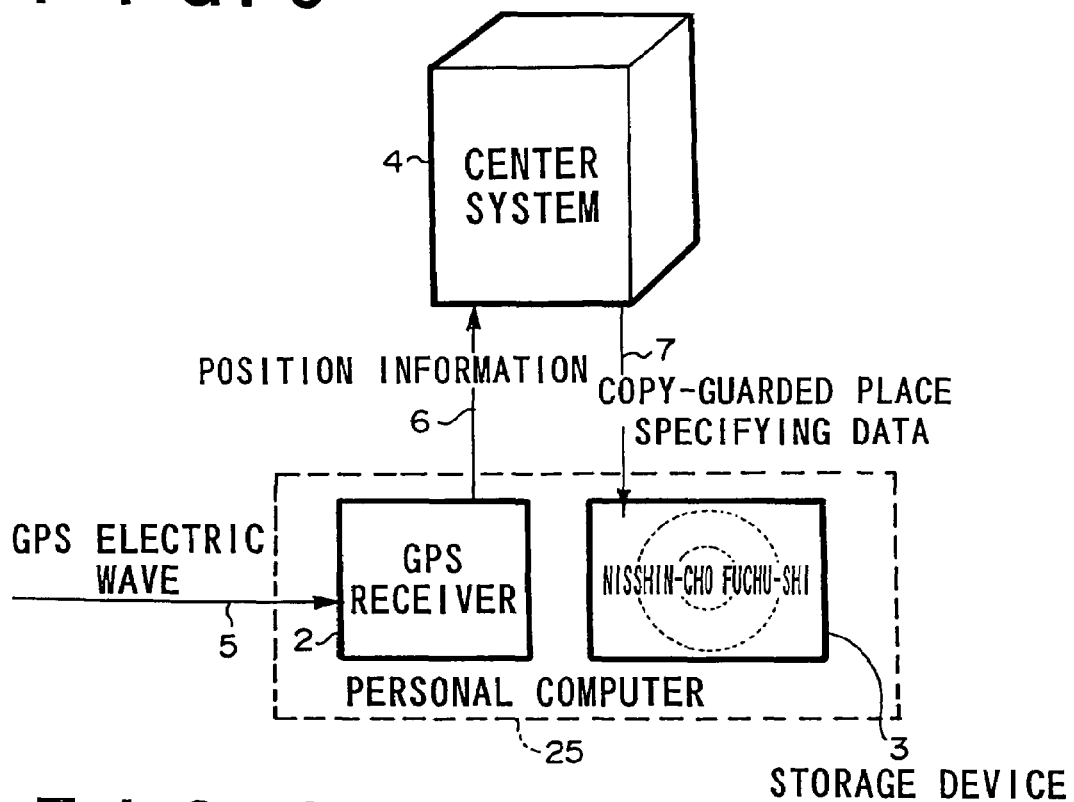
FIG. 5 is a schematic diagram showing a third embodiment of the position authentication system and electronic equipment used for the position authentication system according to the present invention.

The present invention is not limited to the above embodiment, and for example when portable electronic equipment (moving terminal) is a personal computer 25 as shown in FIG. 5, there can be implemented an electric stamp function of recording the copy-guarded place-specifying data 7 as information which can be obtained only at the specific space.

Figure 6:
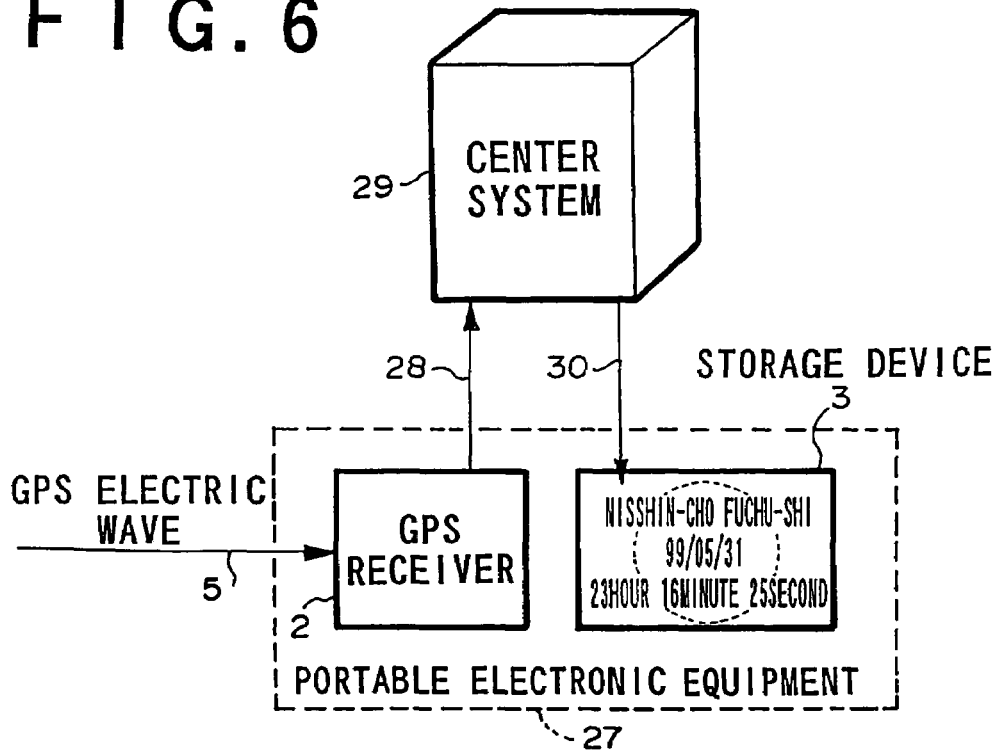
FIG. 6 is a schematic diagram showing a fourth embodiment of the position authentication system and electronic equipment used for the position authentication system according to the present invention.
Figure 7:
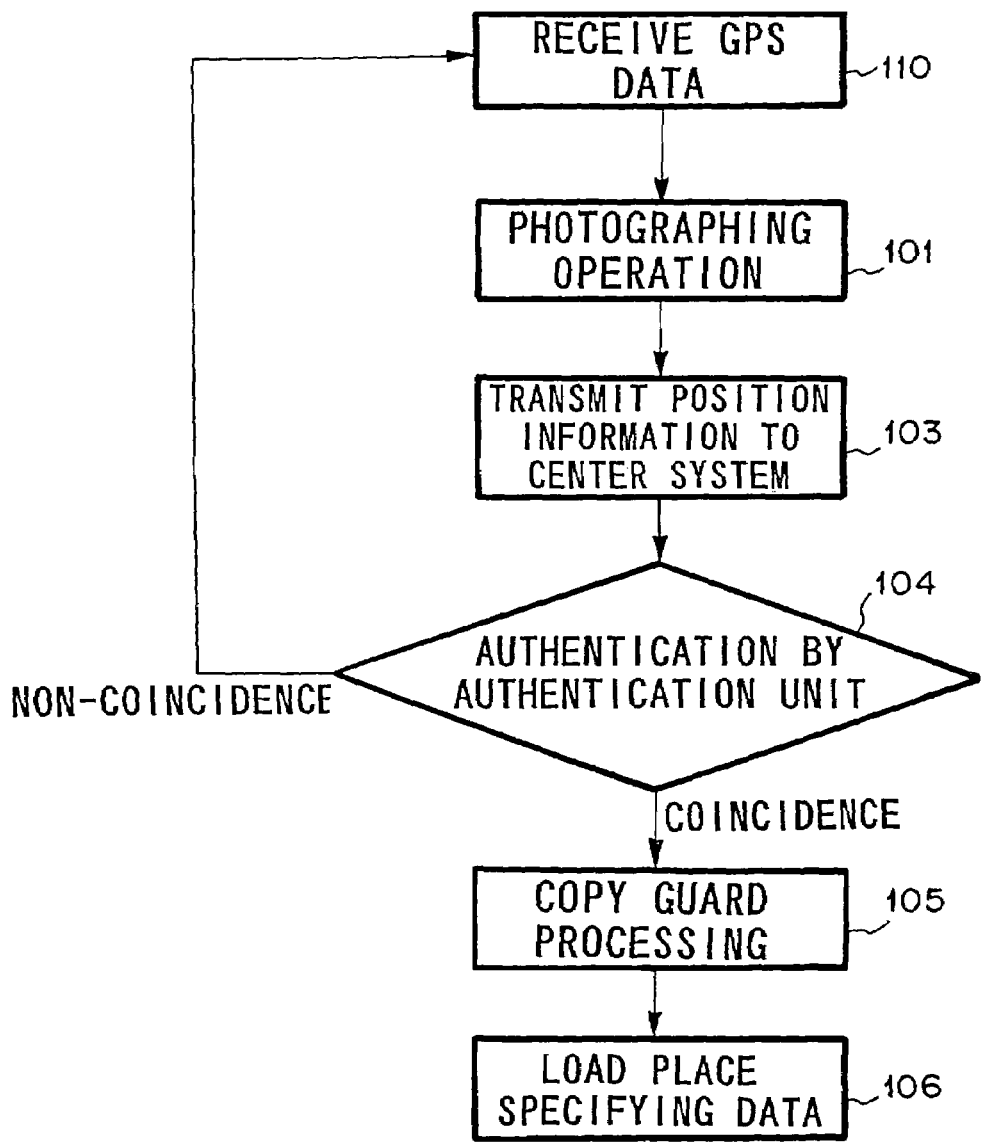
FIG. 7 is a flow chart showing the other embodiment of the position authentication system and electronic equipment used for the position authentication system according to the present invention.

Further, as shown in FIG. 6 portable electronic equipment (moving terminal) such as a digital camera, a personal computer or the like may be designed so that time information is obtained from the GPS electric wave 5. In this case, position information/time information 28 are transmitted to the center system 29, and the copy-guarded place/time specifying data 30 are transmitted from the center system 29 to the terminal 27 serving as the transmission source, whereby the specific place and time can be authenticated. Further, as shown in FIG. 7, if the authentication result of the authentication unit in step 104 indicates the authentication non-coincidence, the GPS data may be referred to at all times by receiving the GPS data (step 110).

In the above-described embodiment, the latitude/longitude information is obtained on the basis of the GPS signals from the GPS satellites. However, the position information may be obtained from PHS (Personal Handy Phone).

As described above, according to the present invention, the electronic equipment generates the current position information and transmitted it to the center system. At the center system, the position information is authenticated and then subjected to the copy guard-processing and returns it to the electronic equipment. The electronic equipment stores the copy-guarded data into the storage means thereof. Therefore, the position information authenticated by the center system can be stored in the storage means of the electronic equipment, and the position authentication function of indicating that the electronic equipment surely existed at the place indicated by the place-specifying data can be implemented. The position authentication function is carried out by the center system, so that the cost-up of the electronic equipment can be suppressed to the minimum level.

What is claimed is:
1. An position authentication system, comprising:
portable electronic equipment including at least position information detecting-and transmitting-means for detecting current position information, encrypting the position information and transmitting the encrypted position information to the outside, and storage means for storing reception data; and
a center system for receiving the position information transmitted from said electronic equipment, authenticating the position information, generating place-specifying data indicated by the position information thus authenticated and then performing a copy guard-processing on the place-specifying data, and transmitting the place-specifying data thus processed to said electronic equipment which has transmitted the position information, thereby storing the place-specifying data into said storage means of said electronic equipment.

2. The position authentication system as claimed in claim 1, wherein said center system comprises an authentication unit for receiving the position information which is encrypted and transmitted by said electronic equipment, and authenticating whether the position information received can be decoded or not; a place-specifying data base for accepting the position information decoded by said authentication unit, and outputting place-specifying data representing the place indicated by the position information; and a copy guard device for subjecting the place-specifying data to the copy guard-processing and then transmitting the place-specifying data to said electronic equipment.

3. The position authentication system as claimed in claim 1, wherein said position information detecting-and transmitting-means detect the position information and time information, and said center system subjects to a copy guard-processing the signal obtained by adding the place-specifying data to the time information and transmits the copy-guarded signal to said electronic equipment to store the copy-guarded signal in said storage means of said electronic equipment.

4. A position authentication system, comprising:
an electronic equipment including image data-generating means for photographing a desired subject to generate image data, position information detecting means for detecting current position information, transmitting means for encrypting and transmitting the image data and position information, and storage means for storing reception signals; and
a center system including receiving means for receiving the position information and image data transmitted from said electronic equipment, authenticating means for authenticating whether the position information and image data thus received can be decoded, place specifying data-generating means for generating place-specifying data indicated by the authenticated position information, and copy guard-processing means for adding the place-specifying data to the image data received, subjecting the data to a copy guard-processing and transmitting the copy guard-processed data to said electronic equipment to store the data into said storage means of said electronic equipment.

5. An electronic equipment for use in a position authentication system, comprising:
position information detecting-and transmitting-means for detecting current position information, encrypting the position information and then transmitting the encrypted position information to a center system; and
storage means for receiving place-specifying data which is generated on the basis of the position information decoded, authenticated, and subjected to a copy guard-processing by said center system, and transmitted from said center system, and storing the received data,
wherein said position information detecting-and transmitting-means encrypts the position information on the basis of an encryption key which is predetermined for the position information.

6. The electronic equipment as claimed in claim 5, wherein said position information detecting-and transmitting-means is a GPS receiver for receiving a GPS signal transmitted from a GPS satellite group to obtain latitude/longitude information as the position information, encrypting the position information and then transmitting the encrypted position information.

7. A method for authenticating a position of an image comprising:
detecting current position information, encrypting the position information and image data and transmitting the encrypted position information and image data, the position information being encrypted on the basis of an encryption key which is predetermined for the position information and image data;
receiving the encrypted and transmitted position information and image data, authenticating the position information and image data; generating place-specifying data indicated by the position information thus authenticated and then performing a copy guard-processing that adds the place-specifying data to the image data, the authentification being executed according to whether the encrypted position information and image data are decoded or not in accordance with the encryption of the position and image data; and
transmitting the copy-guarded and combined place-specifying data with image data thus processed to a storage medium.

8. A center system for use in a position authentication system, comprising:
an authentication unit for receiving postion information transmitted from an electronic equipment and authenticating the position information; and
means for generating place-specifying data indicated by the position information authenticated, performing a copy guard-processing on the place-specifying data and transmitting the processed place-specifying data to said electronic equipment,
wherein the position information transmitted from said electronic equipment is encrypted on the basis of an encrypted key which is predetermined for said position information, and said authentification unit authentficates the position information according to whether the encrypted position information is decoded or not in accordance with the encryption of the position information.

9. A center system for use in a position authentication system, comprising:
authentication means for receiving position information transmitted from electronic equipment and authenticating the position information; and
an element for generating place-specifying data indicated by the position information authenticated, performing a copy guard processing on the place specifying data and transmitting the processed place-specifying data to said electronic equipment,
wherein the position information transmitted from said electronic equipment is encrypted on the basis of an encrypted key which is predetermined for said position information, and said authentication means authenticates the position information according to whether the encrypted position information is decoded or not in accordance with the encryption of said position information.

10. A position authentication system, comprising:
portable electronic equipment including at least a position information detecting-and transmitting-element for detecting current position information, encrypting the position information, and transmitting the encrypted position information to the outside, and a storage element for storing reception data; and
a center system for receiving the position information transmitted from said electronic equipment, authenticating the position information, generating place-specifying data indicated by the position information thus authenticated and then performing a copy guard-processing on the place-specifying data, and transmitting the place-specifying data thus processed to said electronic equipment which has transmitted the position information, thereby storing the place-specifying data into said storage element of said electronic equipment.

11. A position authentication system, comprising:

electronic equipment including an image data-generating element for photographing a desired subject to generate image data, a position information detecting element for detecting current position information, a transmitting element for encrypting and transmitting the image data and position information, and a storage element for storing reception signals; and a center system including a receiving element for receiving the position information and image data transmitted from said electronic equipment, an authenticating element for authenticating whether the position information and image data thus received can be decoded, a place specifying data-generating element for generating place-specifying data indicated by the authenticated position information, and a copy guard-processing element for adding the place-specifying data to the image data received, subjecting the data to a copy guard-processing, and transmitting the copy guard-processed data to said electronic equipment to store the data into said storage element of said electronic equipment.

12. Electronic equipment for use in a position authentication system, comprising:

a position information detecting-and transmitting-element for detecting current position information, encrypting the position information and then transmitting the encrypted information to a center system; and a storage element for receiving place-specifying data which is generated on the basis of the position information decoded, authenticated, and subjected to a copy guard-processing by said center system and transmitted from said center system, and storing the received data, wherein said position information detecting-and transmitting-element encrypts the position information on the basis of an encryption key which is predetermined for said position information.

13. A center system for use in a position authentication system comprising:

an authentication unit for receiving position information transmitted from an electronic equipment and authenticating the position information; and an element for generating place-specifying data indicated by the position information authenticated, performing a copy guard-processing on the place-specifying data, and transmitting the processed place-specifying data to said electronic equipment, wherein the position information transmitted from said electronic equipment is encrypted on the basis of an encrypted key which is predetermined for said position information, and said authentication unit authenticates the position information according to whether the encrypted position information is decoded or not in accordance with the encryption of said position information.

14. Electronic equipment for use in a position authentication system of which the position authentication is carried out by using said electronic equipment and a center system, said electronic equipment comprising:

position information detecting and transmitting means for detecting current position information, encrypting the position information and then transmitting the encrypted position information to said center system; and storage means for receiving place-specifying data transmitted from said center system and storing the place-specifying data, said place-specifying data being generated by said center system on the basis of the position information decoded and authenticated, and being subjected to a copy guard-processing by said center system, wherein said position information detecting and transmitting means encrypts the position information on the basis of an encryption key which is predetermined for the position information.

* * * * *